(12) United States Patent  (10) Patent No.: US 6,212,682 B1
Kuno  (45) Date of Patent: Apr. 3, 2001

(54) SOUND/MOVING PICTURE REPRODUCTION SYSTEM

(75) Inventor: Takuma Kuno, Nagoya (JP)

(73) Assignee: Brother Kogyo Kabushiki Kaisha and Xing, Inc., Nagoya (JP)

( * ) Notice: Subject to any disclaimer, the term of this patent is extended or adjusted under 35 U.S.C. 154(b) by 0 days.

(21) Appl. No.: 08/985,715

(22) Filed: Dec. 5, 1997

(30) Foreign Application Priority Data

Dec. 6, 1996 (JP) .................................................. 8-342522

(51) Int. Cl.[7] .................................................. H04N 7/173
(52) U.S. Cl. .................................. 725/92; 725/91; 725/98
(58) Field of Search .................................. 709/217, 219, 709/212, 209, 7, 12, 13; 348/7; H01N 1/01, 1/11, 2/177

(56) References Cited

U.S. PATENT DOCUMENTS

| | | | |
|---|---|---|---|
| 5,341,474 | * | 8/1994 | Gelman et al. ........................ 709/206 |
| 5,583,994 | * | 12/1996 | Rangan ................................. 709/219 |
| 5,612,897 | * | 3/1997 | Rege ..................................... 709/219 |
| 5,717,854 | * | 2/1998 | Egawa et al. ......................... 709/219 |
| 5,790,935 | * | 8/1998 | Payton ................................... 348/7 |
| 5,892,913 | * | 4/1999 | Adiga et al. .......................... 709/219 |
| 5,948,070 | * | 9/1999 | Fujita ................................... 709/243 |
| 5,978,567 | * | 11/1999 | Rebane et al. ....................... 709/219 |

* cited by examiner

*Primary Examiner*—Andrew Faile
*Assistant Examiner*—Vivek Srivanstava
(74) *Attorney, Agent, or Firm*—Oliff & Berridge, PLC

(57) ABSTRACT

In a sound/moving picture reproduction system 1, a main data transferring device 2 includes a sound/moving picture data storing portion storing sound/moving picture data. A plurality of auxiliary data transferring devices 4 are connected in parallel to the main data transferring device 2. The auxiliary data transferring devices 4 are arranged in one or more stages along a data transfer direction defined from the main data transferring device toward a plurality of data reproducing devices 8. Each of the plurality of auxiliary data transferring devices 4 includes a copied data storing portion storing copied data of received sound/moving picture data. The main data transferring device reads sound/moving picture data from the is sound/moving picture data storing portion and transfers the read sound/moving picture data to either one of the plurality of auxiliary data transferring devices. Upon receipt of the sound/moving picture data, the auxiliary data transferring device copies the received sound/moving picture data into the copied data storing portion and transfers the copied sound/moving picture data to a desired data reproducing device.

10 Claims, 11 Drawing Sheets

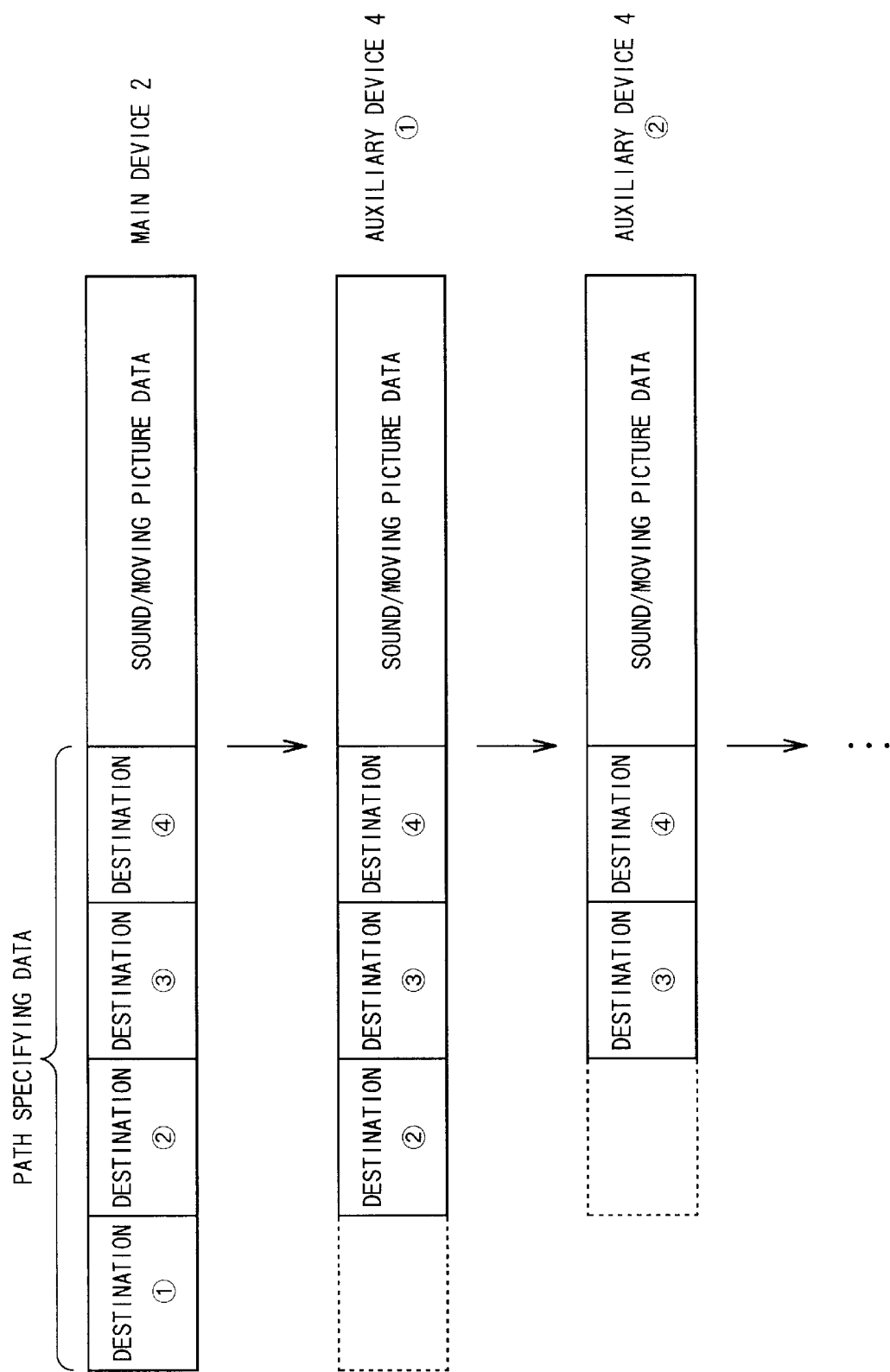

SOUND/MOVING PICTURE REPRODUCTION SYSTEM

BACKGROUND OF THE INVENTION

1. Field of the Invention

The present invention relates to a sound/moving picture reproduction system used in a video server system or the like.

2. Description of Related Art

There has been proposed several types of video server systems.

SUMMARY OF THE INVENTION

FIG. 1 shown a conceivable video server system 100. In this system, a host device 101 includes a data storage device 102, which stores therein a plurality of sets of sound/moving picture data representative of a plurality of movies and programs. A plurality of data reproducing devices 110 are connected to the host device 101. When a certain sound/moving picture is requested from a data reproducing device 110, the host device 101 transfers the requested sound/moving picture data to the data reproducing device 110 that has requested the data.

The data storing device 102 in constructed from a disk array of a plurality of hard disk devices, which will be referred to as HDDs hereinafter. The plurality of sets of sound/moving picture data are stored in the plurality of HDDs. When some reproduction devices 110 transmit request data R to the host device 101, a CPU 104 in the host device 110 retrieves the requested sets of sound/moving picture data from the data storing device 102. The retrieved sets of data are than transferred via an I/O port 105 and a host bus 107 to a network interface circuit (which will be referred to au a NIC hereinafter) 106. The NIC 106 transmits the sets of sound/moving picture data, via a transfer path 108, to a hub 109, which in turn distributes these sets of sound/moving picture data to the data reproducing devices 110 that have requested the sound/moving picture data.

It is now assumed that the total number of the data reproducing devices 110 is "n" ("n" is an integer higher than one (1)) and that the transfer rate, at which the host device 101 can transfer the sound/moving picture data to the data reproducing devices, is "D" [bps], for example. In this case, the total data transfer amount DT, by which data is transferred at maximum along the data transfer path 108, is calculated as D×n. The amount of data transferred through the host bus 107 is therefore equal to D×n. It is apparent that the amount of data transferred through the host bus 107 will increase in proportion to the number of the data reproducing devices 110. Accordingly, when the number of the data reproducing devices 110 increases, it becomes necessary to use a hub 109 with high power and a data transfer path 108 with high capability. It further becomes necessary to use a NSC 106, a host bus 107, a data storing device 102, and a CPU 104 all with high capability.

For example, the data storing device 102 is constructed from an array of the HDDs 103. Because data can be written into and read from the HDDe 103 in parallel, the data input/output speed of the data storing device 102 is high. When the amount of data to be transferred increases, it is necessary to increase the number of HDDC 103, from which data will be read in parallel. The data storing device 102 becomes a large sized disk array. The CPU 104, which controls the reading and transferring operation of the data storing device 102, is also required to perform its operation at a higher speed. The entire system will be expensive and will be large. The entire system may possibly generate too much amount of heat.

It is therefore, an object of the present invention to overcome the above-describe drawbacks, and to provide an improved sound/moving picture data reproduction system which can be constructed at a low cost, but which has a sufficiently high data transfer capability and therefore which can perform high quality transfer operation even with a large number of data reproducing devices.

In order to attain the above and other objects, the present invention provides a sound/moving picture reproduction system, comprising: a main data transferring device including a sound/moving picture data storing portion storing sound/moving picture data; a plurality of auxiliary data transferring devices connected to the main data transferring device, each of the plurality of auxiliary data transferring devices including a copied data storing portion storing copied data of the received sound/moving picture data; and a plurality of data reproducing devices connected to at least a part of the plurality of auxiliary data transferring devices, each of the plurality of data reproducing devices reproducing received sound/moving picture data.

All the plurality of auxiliary data transferring devices may be directly connected in parallel to the main data transferring device. In this case, the plurality of data reproducing devices are connected to all the plurality of auxiliary data transferring devices. Or, the plurality of auxiliary data transferring devices may be arranged in more than one stages so that the plurality of auxiliary data transferring devices include a first stage of auxiliary data transferring devices that are directly connected in parallel to the main data transferring device and at least one subsequent stage of auxiliary data transferring device that are connected to the first stage of auxiliary data transferring devices, the at least one subsequent stage of auxiliary data transferring devices including a final stage of auxiliary data transferring devices that are connected in parallel to the plurality of data reproducing devices.

BRIEF DESCRIPTION OF THE DRAWINGS

The above and other objects, features and advantages of the invention will become more apparent from reading the following description of the preferred embodiment taken in connection with the accompanying drawings in which:

FIG. 11 illustrates path specifying data used in the modification of FIG. 10.

DETAILED DESCRIPTION OF THE PREFERRED EMBODIMENT

Figure 1:
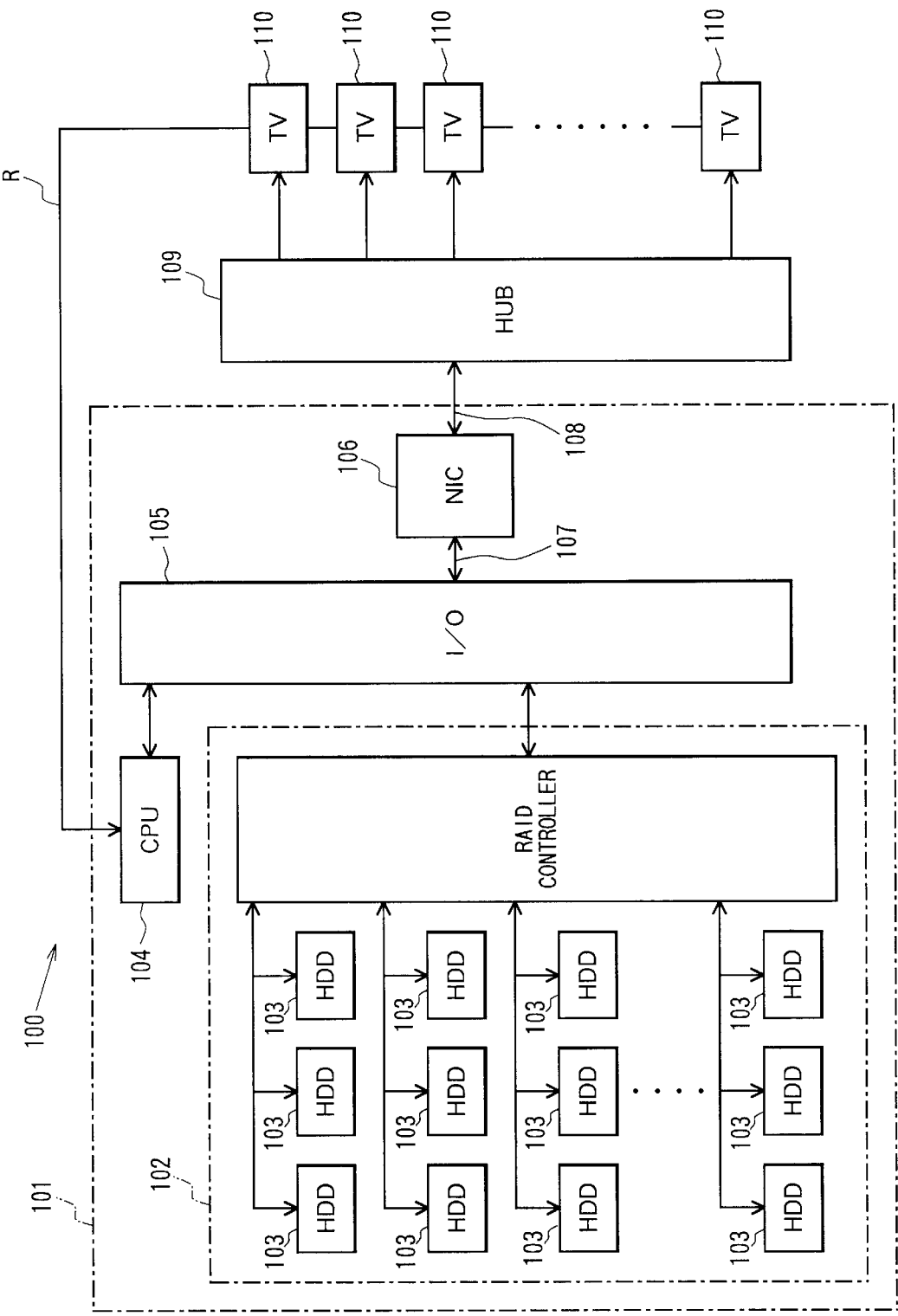
FIG. 1 is a block diagram showing a conceivable video server system.

A sound/moving picture reproduction system according to the present invention will be described while referring to the accompanying drawings wherein like parts and components are designated by the same reference numerals.

Figure 2:
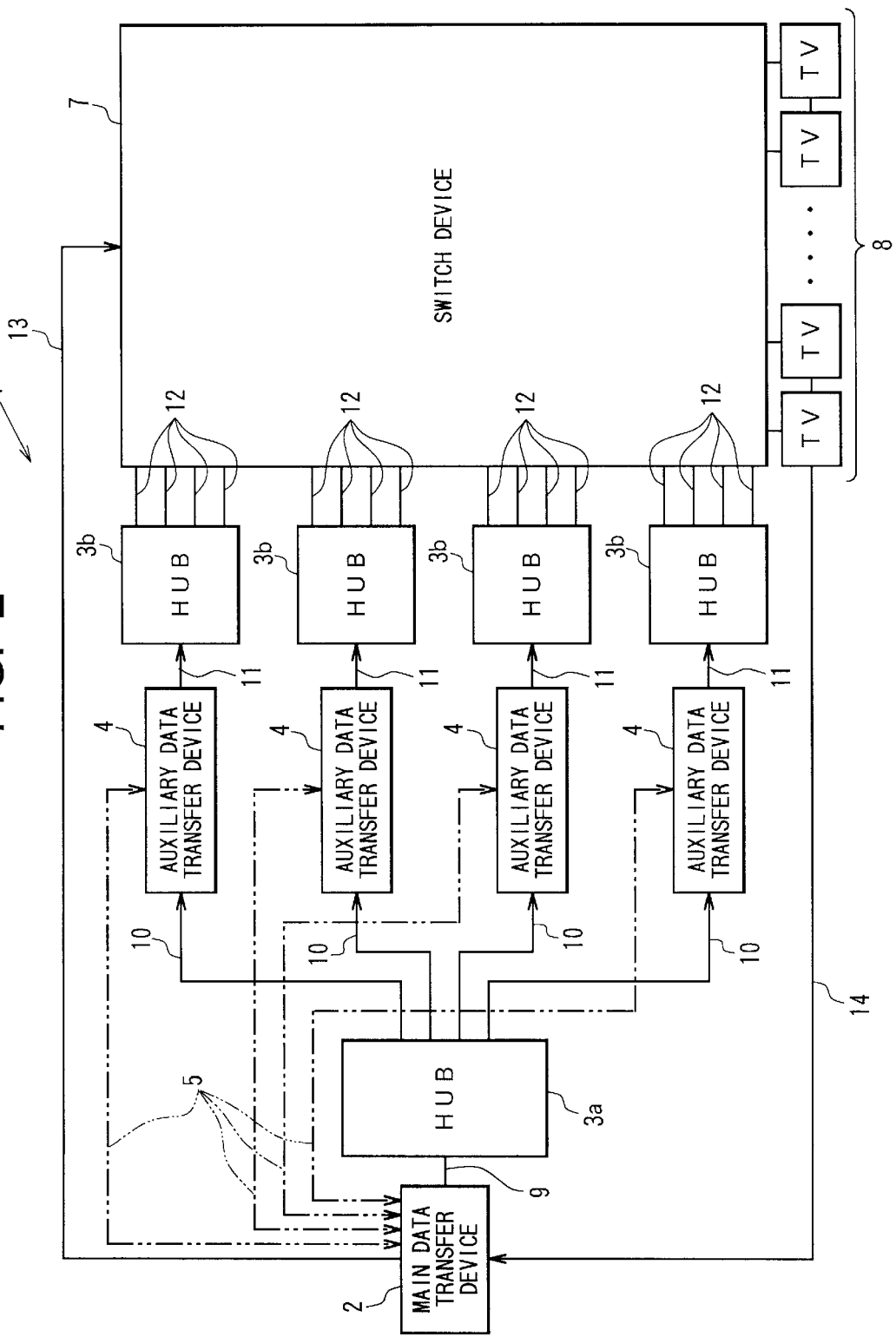
FIG. 2 is a block diagram showing an entire structure of a video server system according to an embodiment of the present invention.

FIG. 2 shown a video server system according to a preferred embodiment of the sound/moving picture reproduction system of the present invention.

An shown in FIG. 2, the video server system 1 Includes: a main data transferring device 2, a plurality of auxiliary data transferring devices 4, and a plurality of data reproducing devices 8. The auxiliary data transferring devices 4 are connected in parallel to the main data transferring device 2 via a main hub 3a. The main hub 3a serves to distribute data from the main data transferring device 2 to the plurality of auxiliary data transferring devices 4. That is, the main hub 3a is connected to a plurality of data transferring paths 10, which are in turn connected to the plurality of auxiliary data transferring devices 4. The plurality of auxiliary data transferring devices 4 are then connected to the data reproducing devices 8 via a plurality of auxiliary hubs 3b and a single switch device 7. The data reproducing devices 8 are connected to the main data transferring device 2 through a communication path 14. The switch device 7 in connected to the main data transferring device 2 via a signal line 13.

Figure 3:
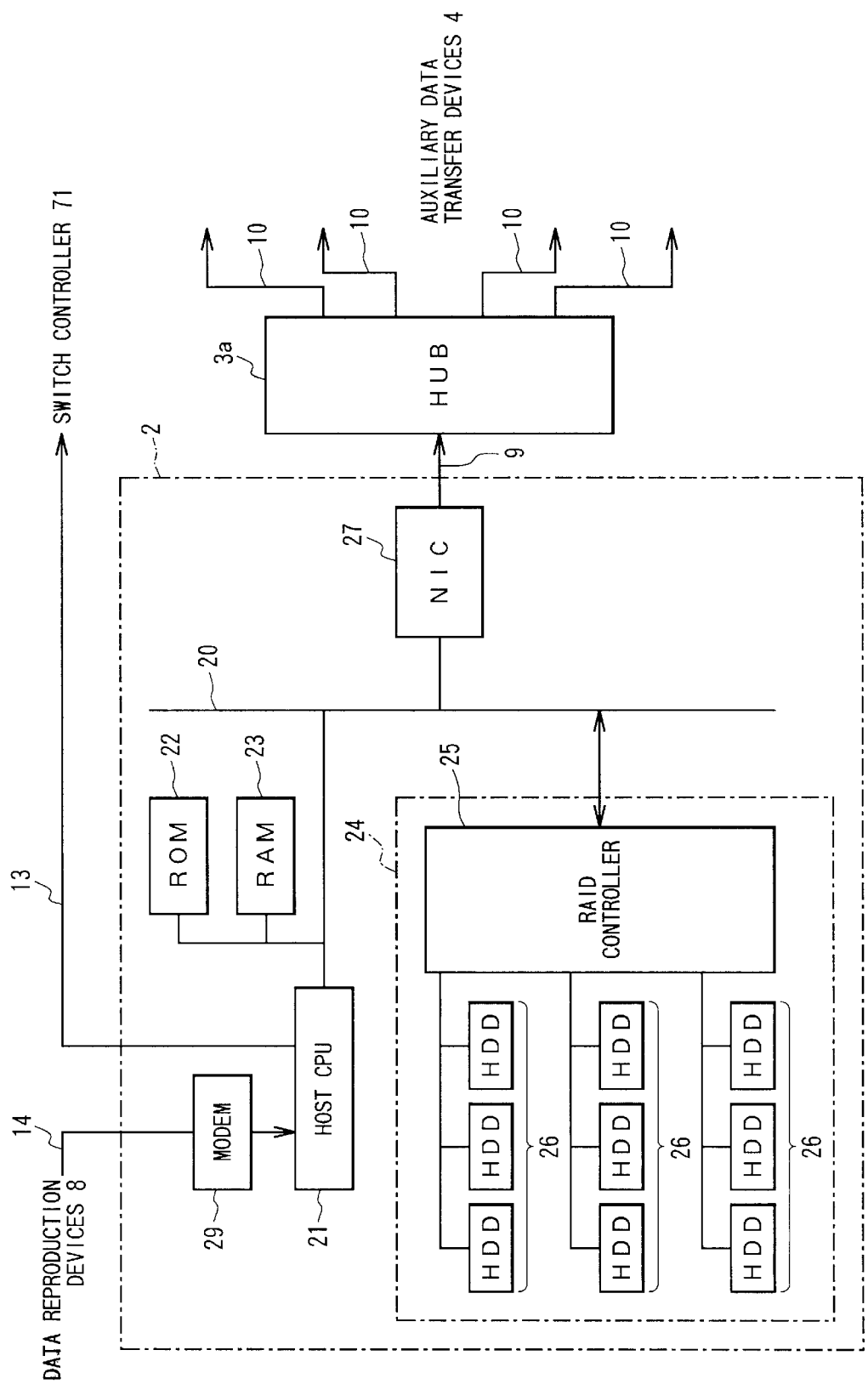
FIG. 3 is a block diagram of a main data transferring device in the video server system of FIG. 2.

As shown in FIG. 3, the main data transferring device 2 includes: a host CPU 21, a ROM 22, a RAM 23, a network interface circuit (NIC) 27, and a data storing device 24 which are connected with one another via a host bus 20. The main date transferring device 2 further includes a modem 29 for receiving signals from the plural data reproducing devices via the communication path 14. The modem 29 is connected to the CPU 21.

The data storing device 24 stores therein a plurality of sets of sound/moving picture data. Each set of sound/moving picture data is comprised of a corresponding set of sound data and a corresponding set of moving picture data. The sound/moving picture data is compressed according to a predetermined format such as a format "MPEG1" or a format "MPEG2". The data storing device 24 is constructed from several disc arrays which are also known as RAID (Redundant Arrays of Inexpensive Disks). That in, the data storing device 24 includes a plurality of hard disk devices or hard disk drives (HDDs) 26 for storing the plurality of sets of sound/moving picture data and a RAID controller 25 for controlling data input operation to and data output operation from the HDDs 26. The HDDs 26 are connected in parallel with the RAID controller 25 via a SCSI bus, for example.

When inputting the plural sets of sound/moving picture data, each set of sound/moving picture data is divided into several data blocks. The several data blocks are then stored separately in some of the plurality of HDDs 26. Accordingly, the blocks in each not of sound/moving picture data can be written into and read from the HDDs 26 in parallel. Each set of sound/moving picture data can therefore be inputted into and outputted from the data storing device 24 within a short period of time.

Redundant data is prepared for each data block as error correction information. Even when a part of the data block is lost, the original data block can be restored with using the redundant data. Representative exile of the redundant data include a parity code, a Hamming code, a BCH code, and a Read Solomon code. It in noted that one of the plurality of HDDs 26 is used for exclusively storing the redundant data for the data blocks of all the plurality of sets of sound/moving picture data. This HDD will be referred to an a "correction data storing HDD" hereinafter. Other remaining HDDs will be referred to as "actual data storing HDDs" hereinafter. Even when one data block may not be read from one actual data storing HDD, that data block can be restored by the redundant data read out from the correction data storing HDD and other data blocks read out from the actual data storing HDDs. It is therefore possible to enhance reliability of data reproduction. The above-described data correction operation is performed also by the RAID controller 25.

The host CPU 21 in for controlling the entire main data transferring device 2. The host CPU 21 is connected to each of the data reproducing devices 8 via the communication path 14 and the modem 29. The host CPU 21 receives a sound/moving picture request signal transmitted from each of the data reproducing device 8 via the communication path 14 and the modem 29. Upon receipt of the request signal, the host CPU 21 determines a data transferring path, along which the requested sound/moving picture data to to be transferred toward the data reproducing device 8 that has requested the sound/moving picture data. Then, the host CPU 21 reads the data blocks for the requested sound/moving picture data from the data storing device 24. Then, the host CPU 21 transfers the sound/moving picture data to one auxiliary data transferring device 4 that is located on the determined data transferring path. Thus, the host CPU 21 serves to determine the data transferring path, along which requested data should be transferred in a direction toward the data reproducing device 8 that has requested supply of the data. The host CPU 21 also serves to output the requested data to the thus determined data transferring path.

The ROM 22 previously stores therein a control program for controlling the CPU 21 to perform the above-described operation. The RAM 23 serves as a work area for the host CPU 21.

The NIC 27 is connected to the main hub 3a via a main bus 9. The NIC 27 is controlled by commands supplied from the host CPU 21 so as to control the HUB 3a to select one of the pluralilty of data transferring paths 10 that extends along the data transferring path determined by the host CPU 21. The thus selected data transferring path 10 is connected to one of the plurality of auxiliary data transferring device 4 that is also located on the dote ad data transferring path am a transfer destination, to which the requested data in to be transferred from the main data transferring device 2. The NIC 27 serves to transfer the sound/moving picture data, read out from the data storing device 24, to that auxiliary data transferring device 4 via a main bus 9, the HUB 3a, and the selected data transferring path 10. The plural data transferring paths 10 are provided in a coaxial cable or an optical-fiber cable.

Figure 4:
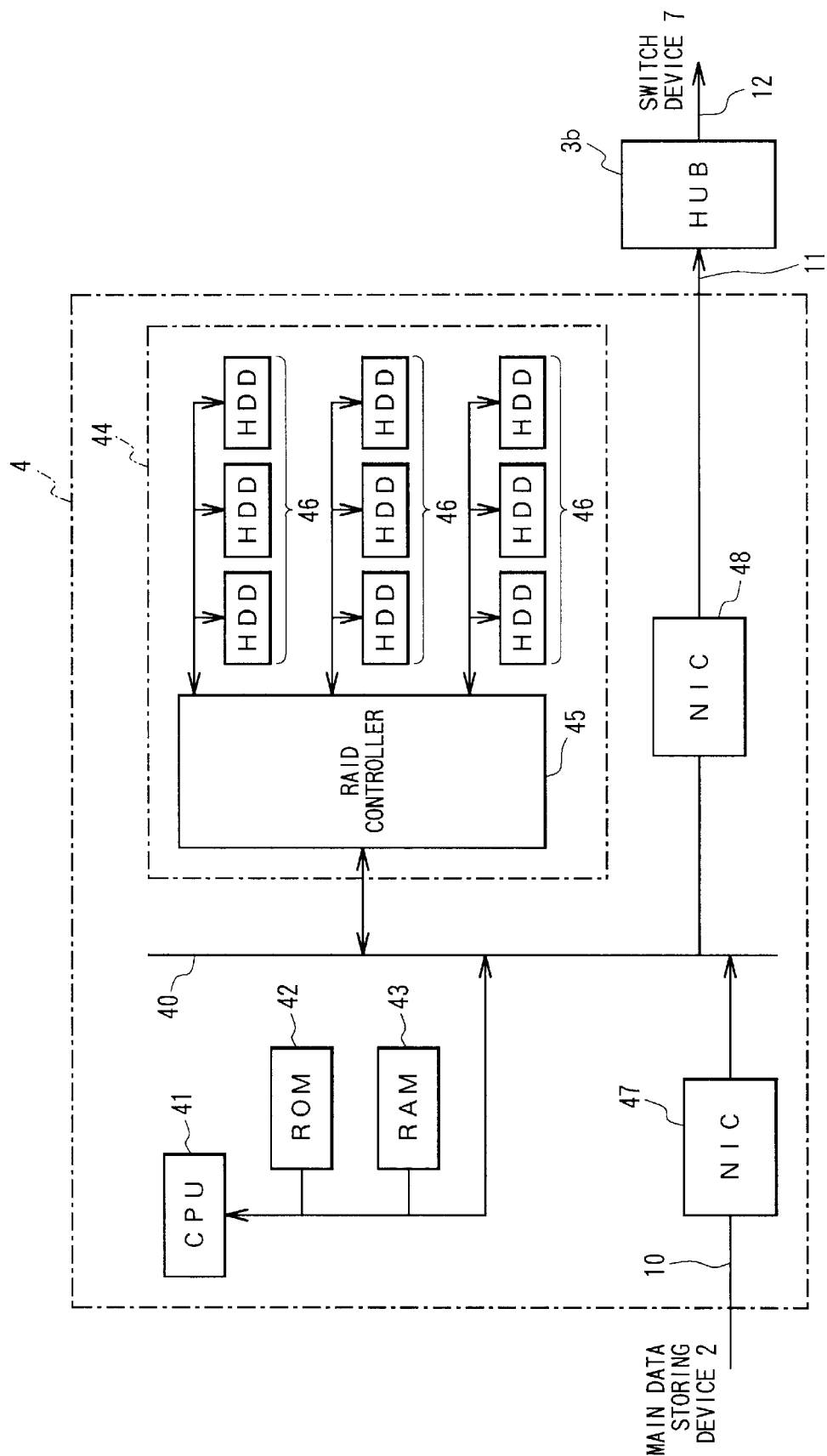
FIG. 4 is a block diagram of an auxiliary data transferring device in the video server system of FIG. 2.

An shown in FIG. 4, the structure of each of the auxiliary data transferring devices 4 is almost the same as that of the main data transferring device 2. That is, each auxiliary data transferring device 4 includes: a CPU 41, a ROM 42, a RAM 43, and a data storing device 44 which are connected with one another via a host bus 40. The host bus 40 is connected also with a NIC 47 and another NIC 48. The NIC 47 is connected to the main data transferring device 2 via a corresponding data transferring path 10. The NIC 47 is for receiving sound/moving picture data supplied from the main data transferring device 2 via the data transferring path 10.

The data storing device 44 serves to store a copy of the received sound/moving picture data. The data storing device 44 is constructed also from a RAID controller 45 and several disk arrays comprised of a plurality of hard disk devices (HDDs) 46 which are connected with the RAID controller 45 in parallel. The RAID controller 45 is for receiving a copy of the received sound/moving picture data and for storing the copy data into some of the HDDs 46. The HDDs 46 will temporally store the copied data.

The CPU 41 in for controlling the entire auxiliary data transferring device 4. The CPU 41 serves to produce a copy of the received sound/moving picture data and to store the copied data into the data storing device 44. The CPU 41 further serves to read out the copied data from the data storing device 44, and to transfer the copied data toward a transfer destination, to which the CPU 41 in instructed by the main data transferring device 2 to transfer the copied data. In this embodiment, the CPU 41 transfers the copied data to the data reproducing device 8 that has requested supply of data. In other words, the CPU 41 transfers the copied data to the final transfer destination, to which the requested data has to be finally transferred.

The ROM 42 previously stores therein a control program for controlling the CPU 41 to perform the above-described operation. The RAM 43 serves as an work area for the CPU 41. An amount of a memory provided in the data storing device 44 can be made smaller than that of the data storing device 24. It is sufficient that the amount of the memory 44 may store at least one set of the compressed sound/moving picture data.

The NIC 48 is connected to a corresponding hub 3b via a bus 11. The NIC 48 is for receiving the copied data read out from the data storing device 44, and for outputting the copied data to the corresponding hub 3b via the bus 11. As shown in FIG. 2, each hub 3b is connected with several data output paths 12. The data output paths 12 are connected to the switch device 7.

Figure 6:
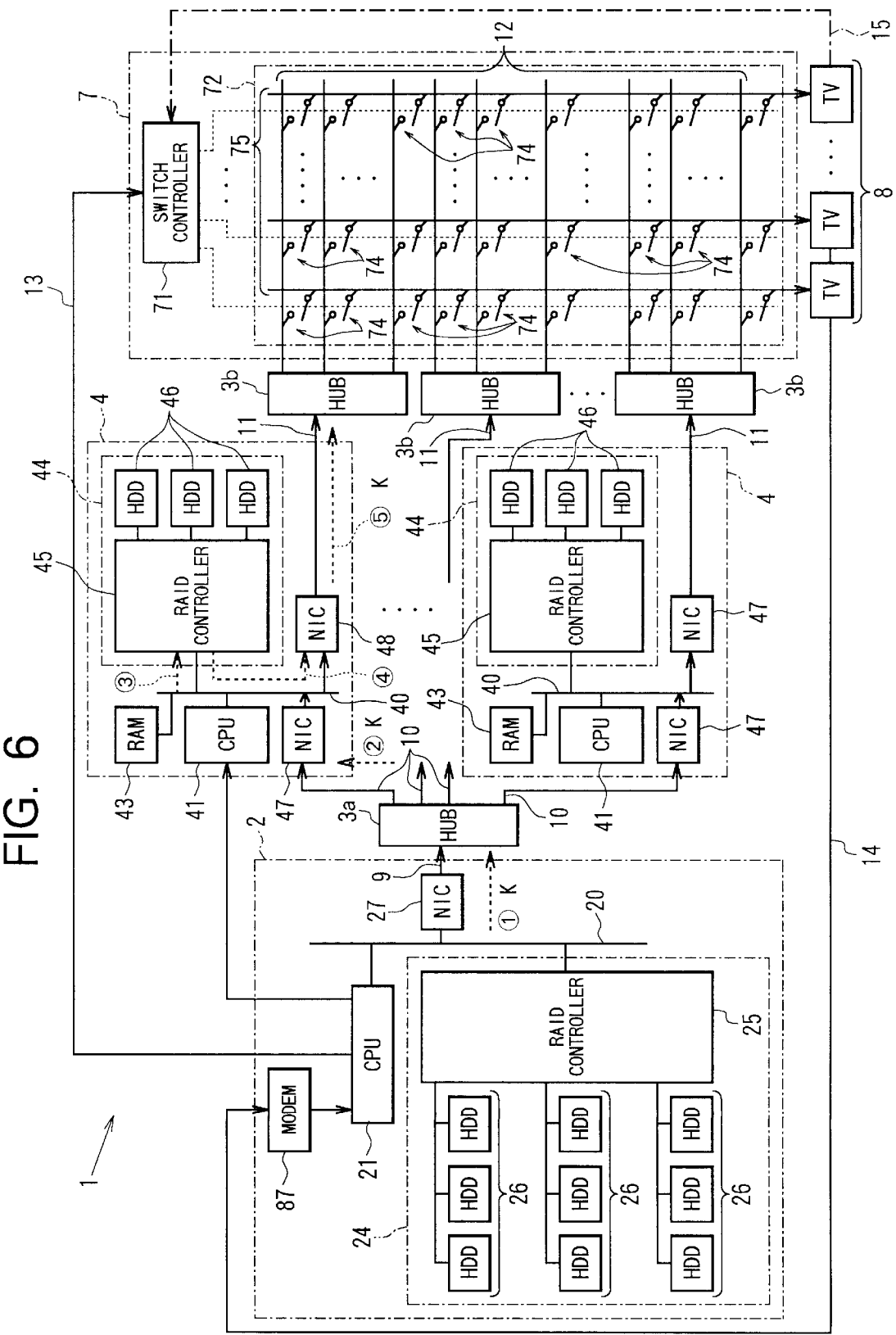
FIG. 6 illustrates how tho video server system of FIG. 2 operates.

As shown in FIG. 6, the switch device 7 includes a switch board 72 and a switch controller 71 connected to the switch board 72. On the switch board 72, all the data output paths 12 from all the hubs 3b are provided extending in one predetermined direction. A plurality of data input paths 75 are also provided on the switch board 72 as extending in a direction perpendicular to the data output paths 12. The data output paths 12 and the data input paths 75 are therefore provided intersecting with one another. Thus, the data output paths 12 and the data input paths 75 are arranged in a grid pattern. Each of the data input paths 75 are connected to a corresponding data reproducing device 8. A switch 74 is provided on each of the intersections between the data output paths 12 and the data input paths 75. The switch 74 is for controlling an electrical connection between the corresponding data output path 12 and the corresponding data Input path 75. That is, when the switch 74 is turned On, the corresponding data output path 12 in electrically connected to the corresponding data input path 75. When the switch 74 is turned OFF, the corresponding data output path 12 is electrically disconnected from the corresponding data input path 75. The switch controller 71 is connected to the host CPU 21 via the signal line 13. The switch controller 71 is for receiving an instruction from the host CPU 21 and accordingly turning ON a certain switch 74, thereby attaining an electrical connection between a corresponding data output path 12 and a corresponding data input path 75. The switch controller 71 is also connected to each data reproducing device 8 via a signal line 15. The switch controller 71 is for receiving an instruction from each data reproducing device 8 and accordingly turning off the switch 74, thereby disconnecting the corresponding data input path 75 from the corresponding data output path 12.

Figure 5:
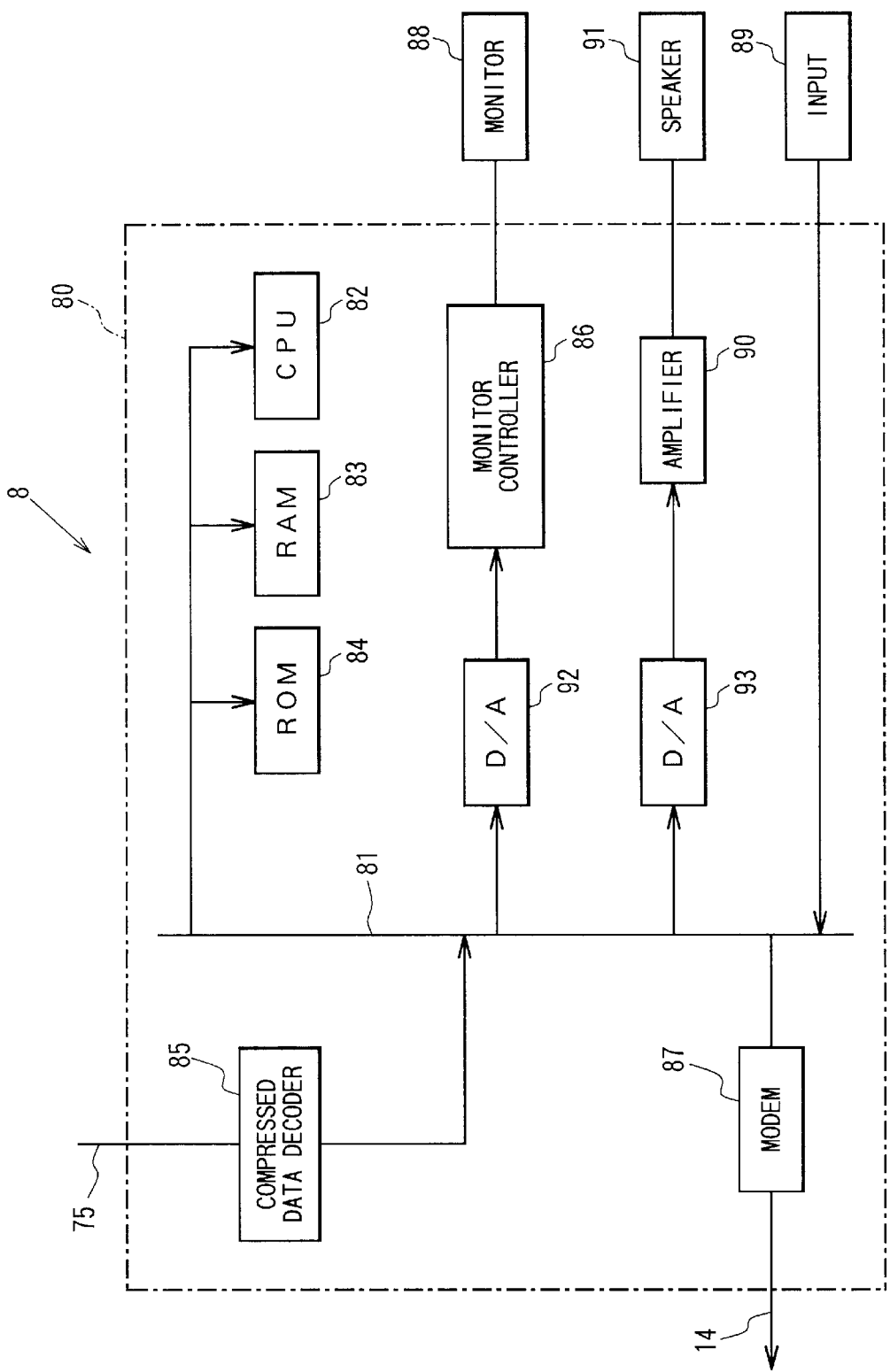
FIG. 5 is a block diagram of a data reproducing device in the video server system of FIG. 2.

As shown in FIG. 5, each data reproducing device 8 has a main body 80 which includes a CPU 82, a RAM 83, a ROM 84, a compressed data decoder 85, a D/A converter 92, another D/A converter 93, an input portion 89, and a modem 87 which are connected with one another via a host bus 81. A monitor controller 86 is connected to the D/A converter 92. An amplifier 90 is connected to the D/A converter 93. The modem 87 is connected via the communication path 14 with the main data transferring device 2.

The monitor controller 86 in connected to a monitor 88. The monitor 88 is for reproducing a moving picture. The amplifier 90 is connected to a speaker 91. The speaker 91 is for outputting sound. A user manipulates the input portion 89 to input a request for his/her desired sound/moving picture data. The CPU 82 produces request data which includes: sound/moving picture specifying data specifying the requested sound/moving picture data; and data reproducing device specifying data specifying the data reproducing device 8, at which the request is made by the input portion 89. For example, the sound/moving picture specifying data is constructed from data of a sound/moving picture number indicative of the retested sound/moving picture data. The data reproducing device specifying data is constructed from data of a device number indicative of the data reproducing device 8 whose input portion 89 is manipulated to input the corresponding request. The request data is transferred to the main data transferring device 2 via the modem 87 through the communication path 14.

The compressed data decoder 85 is connected to the corresponding input data path 75, and is for decompressing received sound/moving picture data of the compressed state, which has been transferred via the input data path 75 from the switch device 7. The moving picture data included in the thus received sound/moving picture data is converted into an analog signal by the D/A converter 92. The analog signal is reproduced by the monitor 88 and outputted as a moving picture. The sound data in the sound/moving picture data is converted into an analog sound signal by the D/A converter 93. The analog sound signal is then amplified by the amplifier 90 before being reproduced by and outputted from the speaker 91.

With the above-identified structure, the video server system 1 operates as described below with reference to the flowcharts of FIGS. 7 through 9.

It is now assumed that a user at one data reproducing device 8 manipulates its input portion 89 to request his/her desired sound/moving picture. The CPU 82 in the data reproducing device 8 produces request data, i.e., data indicative of the requested sound/moving picture number and data indicative of the device number of the subject data reproducing device 8. The request data is transferred to the main data transferring device 2 through the communication path 14.

Figure 7:
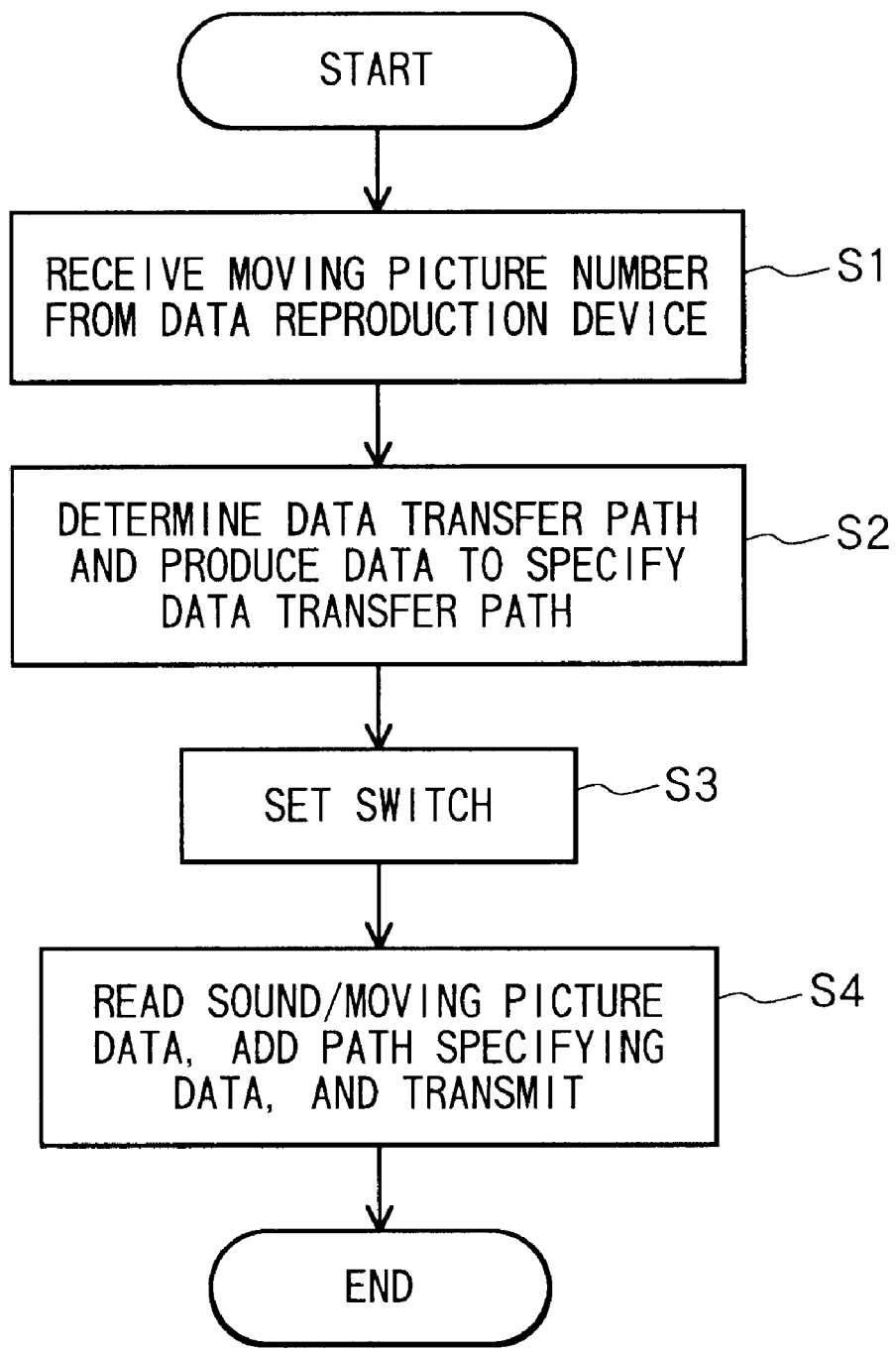
FIG. 7 is a flowchart showing operation of the main data transferring device.

In response to the request data, the main data transferring device 2 starts the operation as shown in FIG. 7.

That is, the main data transferring device 2 first receives the request data, that is, data of the sound/moving picture number and data of the reproducing device number in S1. Then, in S2, the main data transferring device 2 requests, via the signal line 13, the switch controller 71 to supply the main data transferring device 2 with information on a non-occupied, available data output path 12. Based on the supplied information, the main data transferring device 2 determines a data transferring path, along which the requested sound/moving picture data should be transferred to the non-occupied data output path 12. The main data transferring device 2 then produces a path specifying data indicative of the determined data transferring path. The path specifying data is for designating a transfer destination (one auxiliary data transferring device 4 in this embodiment), to which the requested sound/moving picture data should be transferred along the determined data transferring path. In this example, one auxiliary data transferring device 4, that is connected to the determined non-occupied data output path 12 is selected as the transfer destination, to which the main data transferring device 2 should transfer the requested data.

Then, in S3, the host CPU 21 instructs the switch controller 71 to turn ON a switch 74 that is located on the intersection between the non-occupied data output path 12 and the data input path 75 connected to the data reproducing device 8 that has requested data transmission. The host CPU 21 then informs the NIC 27 which of the data transferring paths 10 should be used from the HUB 3a. In this example, one data transferring path 10, that in connected to the determined destination device 4, is selected to be used.

Then, In S4, the host CPU 21 reads, from the data storing device 24, all the blocks for the set of sound/moving picture data indicated by the received sound/moving picture number. The host CPU 21 adds the path specifying data, as a header, to the read out sound/moving picture data, and outputs it to the NIC 27 as indicated by an arrow ① in FIG. 6 toward the determined transferring path. As indicated by an arrow ② in FIG. 6, the NIC 27 then transfers the sound/moving picture data to the destination auxiliary data transferring device 4 via the hub 3a and one data transferring path 10 that is instructed as being located along the determined data transferring path.

Figure 8:
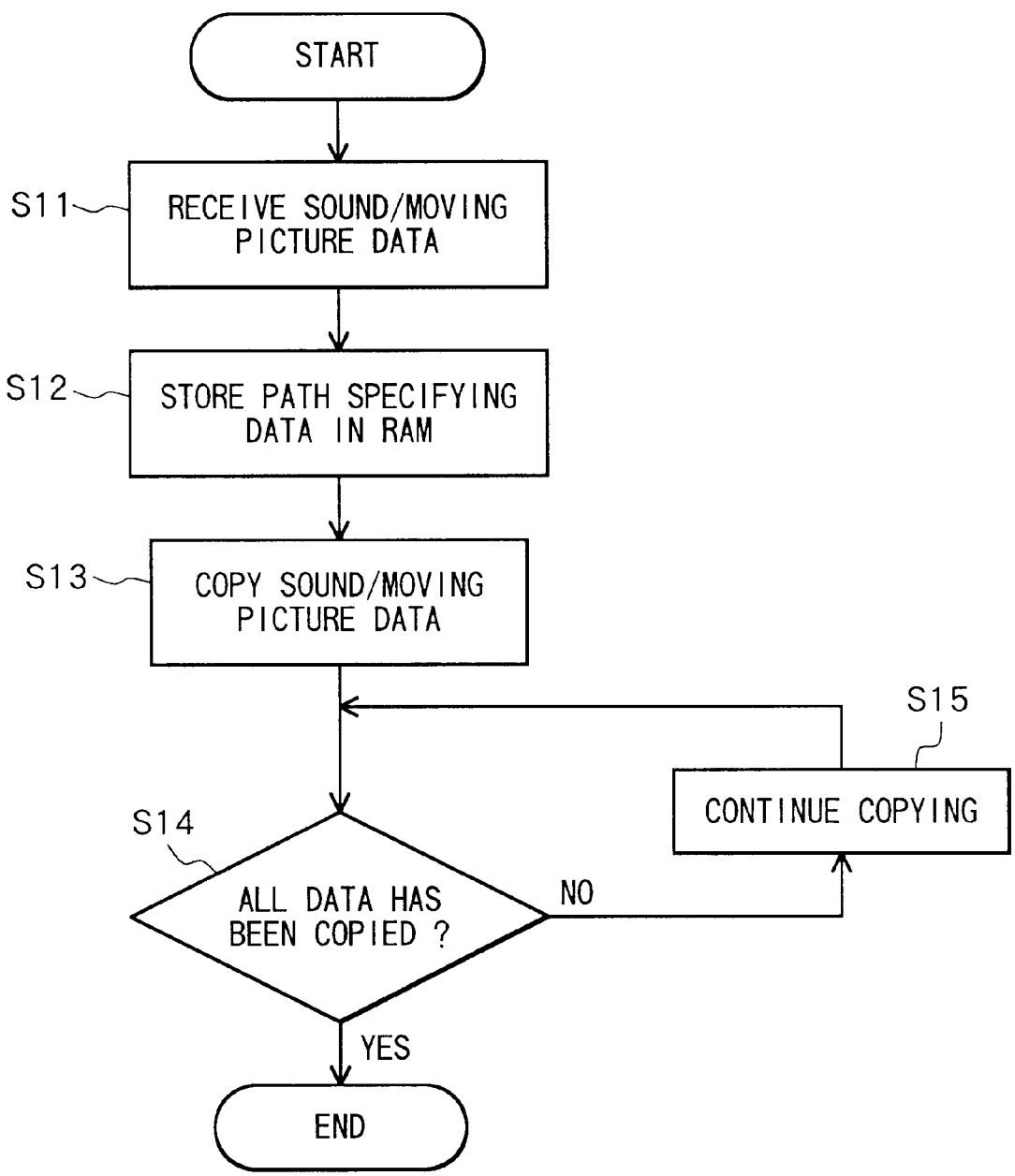
FIG. 8 is a flowchart showing data copying operation of the auxiliary data transferring device.

Then, the auxiliary data transferring device 4, that is located on the data transferring path, performs data copying operation as shown in the flowchart of FIG. 8.

That is, first, in S11, the CPU 41 receives the sound/moving picture data added with the path specifying data. In S12, the CPU 41 stores the path specifying data in the RAM 43. In S139 the CPU 41 starts copying the received sound/moving picture date and stores the copied data in the data storing device 44 as indicated by an arrow ③ in FIG. 6. This copying operation will be continued until the entire not of sound/moving picture data is copied and stored into the device 44.

Figure 9:
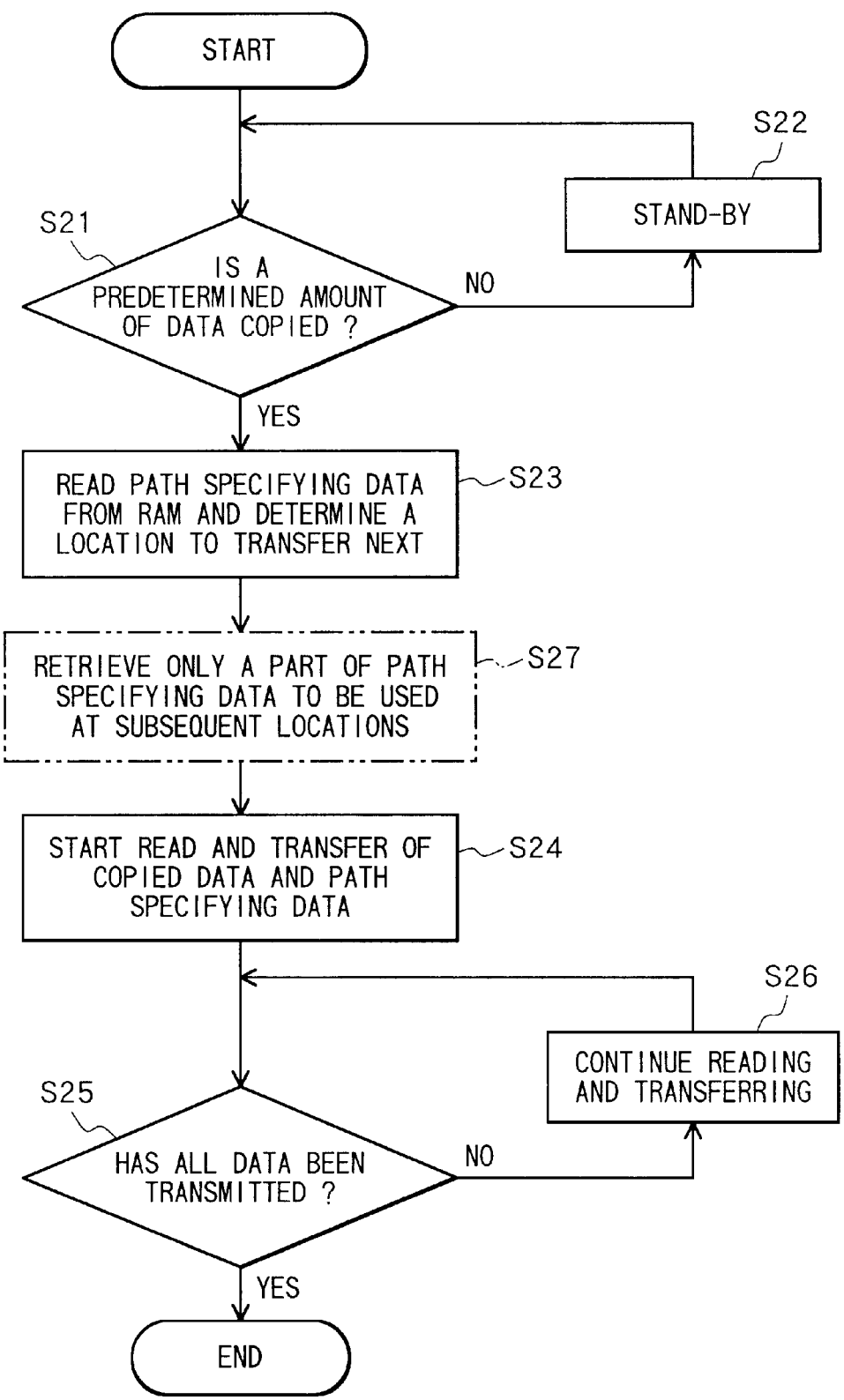
FIG. 9 is a flowchart showing data reading/transferring operation of the auxiliary data transferring device.

While performing the above-described coping operation of FIG. 8, the CPU 41 perform a sound/moving picture data reading and transferring operation shown in FIG. 9.

That is, In S21, the CPU 41 judges whether or not a predetermined amount of sound/moving picture data has been copied and stored in the data storing device 44. When the predetermined amount of sound/moving picture data has been copied and stored in the data storing device 44 ("yes" in S21), the program proceeds to S23. In S23. the CPU 41 reads the path specifying data from the RAM 43. Based on the path specifying data, the CPU 41 determines a destination, to which the CPU 41 should transfer the presently-copied sound/moving picture data along the determined data transferring path. More specifically, the CPU 41 determines one data output path 12, to which the CPU 41 has to transfer the sound/moving picture data. The CPU 41 then instructs the NIC 48 which of the data output paths 12 should be used at the corresponding HUB 3b.

Then, in S24, the CPU 41 reads the copied sound/moving picture data from the data storing device 44 as indicated by an arrow ④ in FIG. 6, and starts transferring the copied sound/moving picture data to the data output path 12 as indicated by an arrow ②.

While the above-described data reading and transferring operation is performed, the data copying operation of FIG. 8 is continued until the entire data is copied.

According to the above-described operation, the copied sound/mowing picture data is transferred to the data reproducing device 8 that has requested the sound/moving picture data. That is, the sound/moving picture data is transferred via the turned-ON switch 74 from the data output path 12 to the data input path 75 which is connected to the data reproducing device 8. In the data reproducing device 8 the sound/moving picture data is decompressed and reproduced.

It is noted that the data reading and transferring operation is ended when the entire sound/moving picture data is transferred to the data reproducing device 8 in S25. When this process is finished, the data reproducing device 8 instructs the switch controller 71 via the communication line 15 to turn off the switch 74, thereby disconnecting the data reproducing device 8 from the data output path 12.

It is now assumed that the main data transferring device 2 is connected to the "N" number of auxiliary data transferring devices 4 and that each auxiliary data transferring device 4 has a capacity distributing data to "n" number of data reproducing devices 8, where N and n are integers higher than one (1). In this case, the video server system 1 can supply sound/moving picture data to "N×n" number of data reproducing devices 8 at maximum.

It is further assumed that the video server system in constructed as shown in FIG. 1 so that the main data transferring device 101 is directly connected to all the "N×n" number of data reproducing devices 110. In this case, the main data transferring device 101 may possibly have to simultaneously supply data to all the N×n number of devices 8. The host CPU 104 in the main data transferring device 101 has to operate at a very high speed in order to prevent occurrence of discontinuities in reproduction of sound and moving pictures. In order to increase the reading speed of data from the data storing device 102, it is necessary to increase the number of the HDDs 103 which are provided in parallel in the data storing device 102. The main data transferring device 102 will become an large as general large-sized computers.

Contrarily, according to the present embodiment, it is sufficient that the main data transferring device 2 transfers data to only "N" number of the auxiliary data transferring devices 4. Accordingly, the number of devices, is to which the main data transferring device 2 has to supply data, is as small as 1/n of the number of devices, to which the main data transferring device 101 has to supply data in the system of FIG. 1. Therefore, the main data transferring device 2 of the present embodiment can be made smaller than that of the device 101 in the system of FIG. 1.

It is sufficient that each auxiliary data transferring device 4 can supply data to only "n" number of the data reproducing devices 8. The number of devices 8, to which each auxiliary data transferring device 4 has to supply data, is as small as 1/N of the number of devices 110, to which the main data transferring device 101 has to supply data in the system of FIG. 1. As described already, the amount of the memory area provided in the data staring device 44 can be made small. Therefore, each auxiliary data transferring device 4 can be made much smaller than the main data transferring device 2. Thus, the entire video server system 1 can be constructed from the plurality of small and inexpensive data transferring devices 2 and 4.

In general, the cost, required for producing a computer (data transferring device) whose operational capacity in increased N times as much as that of a conventional one, will be increased much more than N times as high as the cost required for producing the conventional computer. More specifically, the cost will be increased as N' times as much as the cost for producing the conventional computer where N' is several through several tens times as much as N. It In apparent that it is possible to less costly produce a computer system provided with a plurality of small but inexpensive computers. It is more advantageous to cause a plurality of small-sized computers to cope with data transferring operation than to cause a single large-sized computer to cope with the entire data transferring operation.

Figure 10:
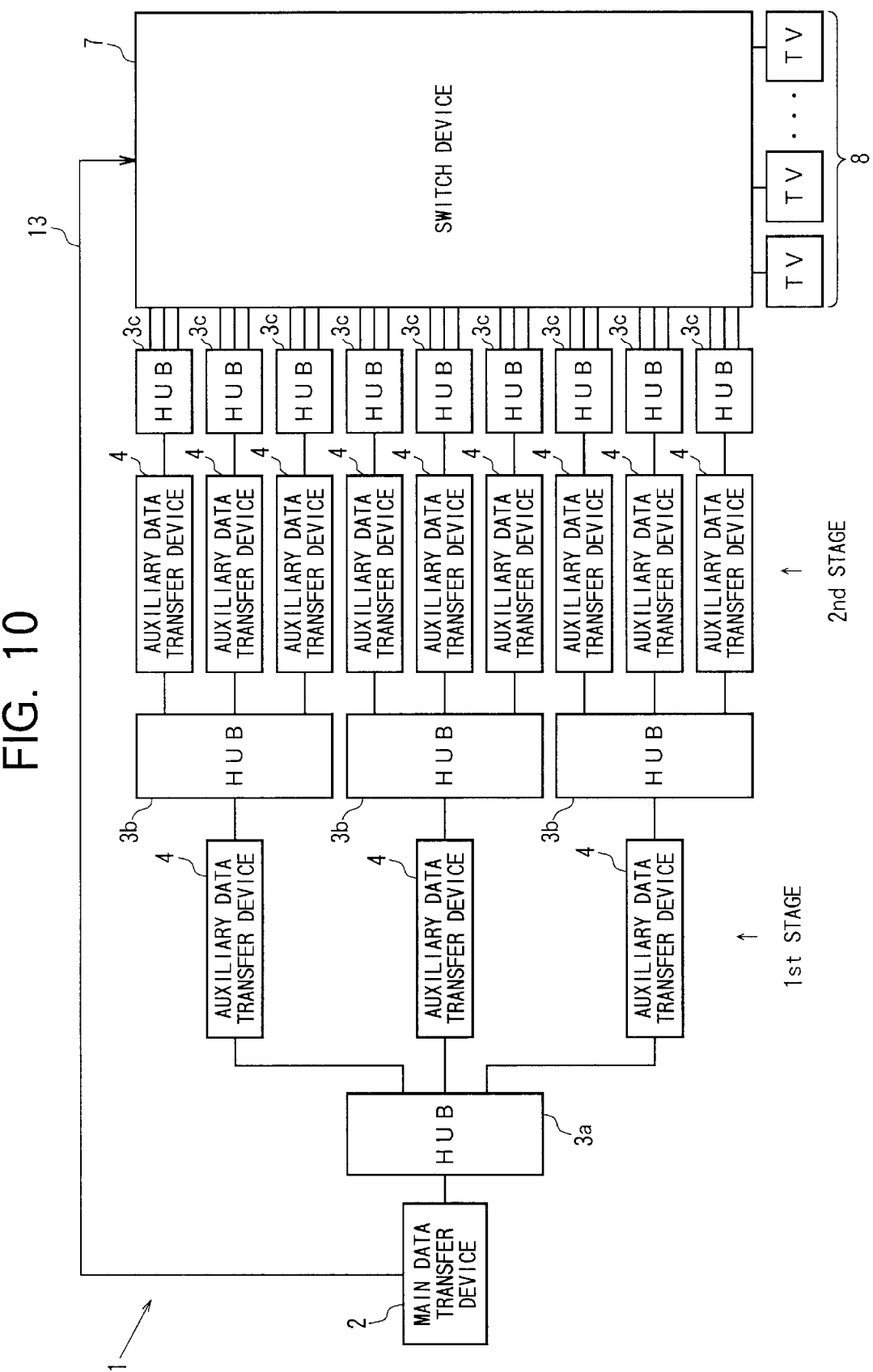
FIG. 10 is a block diagram of a modification of the video server system.

The video server system 1 of the present embodiment can be modified as shown in FIG. 10 when the total number of the data reproducing devices 8 is increased.

According to this modification, the total number of the auxiliary data transferring devices 4 is increased. The auxiliary data transferring devices are arranged in more than one successive stages along a data transferring direction from the main data transferring device 2 toward the data reproducing devices 8. In each of the successive stages, several auxiliary data transferring devices 4 are connected in parallel to auxiliary transferring devices 4 located at a preceding stage, i.e., at a stage in an upstream side of the subject stage in the data transferring direction. In the example of FIG. 10, two stages, i.e, a first stage and a second (final) stage of the auxiliary transferring devices 4 are provided. At the first stage, three auxiliary data transferring devices 4 are provided as being directly connected to the main data transferring device 2. The three auxiliary data transferring devices 4 are connected in parallel to the main data transferring device 2. At the final stage (second stage), nine auxiliary data transferring devices 4 are provided an being connected to the three data transferring devices 4 at the first stage. The nine auxiliary data transferring devices 4 are connected in parallel to the three auxiliary data transferring device 4. The final stage of the auxiliary data transferring devices 4 are then connected to the data reproducing devices 8 via the switch device 7. While each set of data is transferred from the main data transferring device 2 to one data reproducing device 8 that has requested the set of data, the data is transferred through two auxiliary data transferring devices 4 that are located along the determined data transferring path and that are located in the first and the final stages.

It can be said that the video server system 1 of the above-described embodiment in FIG. 2 is provided with a single stage of auxiliary data transferring devices 4. Thus, it can also be said that the video server system of the present embodiment can be provided with the total "M" number of stages in the auxiliary data transferring devices 4, where M is an integer equal to or higher than one (1). In each stage, more than one auxiliary data transferring devices 4 are connected in parallel to one or more data transferring device (2 or 4) at an upstream side stage in the data transferring direction. The data transferring direction is defined as a direction from the main data transferring device 2 toward the data reproducing devices 8. The M number of stages are referred to as first through M-th stages along the data transferring direction. Accordingly, it can be said that the auxiliary data transferring devices 4, at each of the 1-th stages (where $1 < 1 \leq M$), are connected in parallel to more than one data transferring devices 4 at an (i-1)-th stage. The auxiliary data transferring devices 4 at the first stage are connected in parallel to the main data transferring device 2. It is noted that the auxiliary data transferring device 4 at the final stage (M-th stage) are connected via the switch device 7 to the data reproducing devices 8. Accordingly, while each set of data is transferred from the main data transferring device 2 to the data reproducing device 8, the data is transferred through the total M number of auxiliary data transferring devices 4 along the determined data transferring path. This is because the data transferring path in determined to extend through either one of the auxiliary data transferring devices 4 at each of the "M" number of stages.

In this modification, the path a specifying data may be designed as shown in FIG. 11. This path specifying data is added to each set of sound/moving picture data when it is sent from the main data transferring device 2. More specifically, "M" number of sets of destination data are added an Indicative of "M" number of destinations, to which data should be transferred and which are located in the "M" number of successive stages. In other words, each set of destination data is indicative of which auxiliary data transferring device 4 is to be used in a corresponding stage. The example shown in FIG. 11 is for the, case where M in equal to four (4). As apparent from FIG. 11, the path specifying data is constructed from "M" (four, in this example) sets of destination data which are indicative of "M" number of auxiliary data transferring devices 4 in the successive "M" number of stages, through which data is to be transferred. The "M" sets of destination data are arranged from the leading and in the header portion in an order in which the specified "M" number of auxiliary data transferring devices 4 are successively used to transfer the data. In other words, a set of destination data, indicative of an auxiliary data transferring device 4 to be used at the i-th stage ($1 \leq i \leq M$), is located in an i-th position from the leading end in the header portion. For example, a set of destination data indicative of an auxiliary data transferring device 4 to be used at the first stage is located in the leading end of the header portion. Another set of destination data indicative of another auxiliary data transferring device 4 to be used at the final stage (M-th stage) is located In the trailing and in the header portion.

When receiving the sound/moving picture data with the thus designed path specifying data (destination data groups), each auxiliary data transferring device 4 performs transferring operation as described below.

When receiving the path specifying data and the sound/moving picture data, each auxiliary data transferring device 4 first deletes a destination data set that is located at the leading end of the header and that is indicative of the subject auxiliary data transferring device 4. The auxiliary data transferring device 4 then transfers the remaining path specifying data (remaining destination data sets) to an auxiliary data transferring device 4 that is located at the next stage and that is designated by a destination data not presently located at the leading and in the header.

In the example of FIG. 11. the main data transferring device 2 produces the path specifying data constructed from destination data sets ①  through ④ and adds them to the read out sound/moving picture data. The main data transferring device 2 then reads the set of destination data ① that is located at the leading end of the header portion and that is indicative of an auxiliary data transferring device 4 at the first stage, to which data is to be transferred. The main data transferring device 2 deletes the set of destination data ① before transferring the sound/moving picture data with the remaining three sets of destination data ①–③ toward the auxiliary data transferring device indicated by the destination data ①.

When receiving that data, the auxiliary data transferring device 4 indicated by the destination data ① at the first stage reads the set of destination data ②  that is being presently located at the leading and of the header portion and that is indicative of an auxiliary data transferring device 4 at the second stage, to which data is to be transferred. The auxiliary data transferring device 4 deletes the not of destination data ② before transferring the sound/moving picture data with the remaining two sets of destination data ③ and ④ toward the auxiliary data transferring device indicated by the destination data ②. Then, the same operations are performed in the auxiliary data transferring devices at the subsequent stages.

In order to attain the above-described operation, each auxiliary data transferring device 4 at each stage performs the process of S27 between S23 and S24 in the flowchart of FIG. 9 as indicated by dotted lines. That is, after determining the next destination, to which data is to be transferred from the present auxiliary data transferring device 4, the present device 4 retrieves only a part of the path specifying data that will be used in the next and subsequent destinations in S27 and transfers it is S24 together with the sound/moving picture data. In the example of FIG. 11, the auxiliary data transferring device 4 ((①)) at the first stage retrieves only the destination data sets ③–④ to be used at the subsequent third and fourth stages, and transfers the destination data sets ③–⑥ with the sound/moving picture data to the auxiliary data transferring device 4 indicated by the destination data ② at the second stage Thus, each auxiliary data transferring device 4 can quickly and accurately determine the next transfer destination through merely reading the leading end portion of the path specifying data.

The video server system 1 can be modified also as described below.

That is, an indicated by dotted lines in FIG. 2, a plurality of signal lines 3 may be provided between the main data transferring device 2 and each of the auxiliary data transferring devices 4. Each signal line 5 in for informing a corresponding auxiliary data transferring device 4 of a next destination, to which the subject auxiliary data transferring device 4 should transfer sound/moving picture data. The main data transferring device 2 supplies each auxiliary data transferring device 4 with the next destination information before transferring sound/moving picture data to the auxiliary data transferring device 4. In this modification, it becomes unnecessary to add the above-described path specifying data to the sound/moving picture data.

The signal lines 5 can also be used to feedback supply the main data transferring device 2 with information on an operational state of each auxiliary data transferring device 4. Based on the supplied information, the main data transferring device 2 can determine which data transferring path is to be used in order not to use any data-occupied busy paths. This modification can further enhance data transfer efficiency.

The signal lines 5 can also be used in a manner as described below.

When a certain sound/moving picture is requested from a user, the host CPU 21 may judge, via the single lines 5, whether the requested sound/moving picture data has been copied and stored In any auxiliary data transferring devices 4 during an already-performed data transfer operation. When it is judged that some auxiliary data transferring device 4 stores the sound/moving picture data, the host CPU 21 then instructs the auxiliary data transferring device 4 to read out the subject sound/moving picture data and then to transfer it to the data reproducing device where the user is located.

According to this modification, it is sufficient that the main data transferring device 2 reads each set of sound/moving picture data from the data storing device 24 only once even when the sound/moving picture data is frequently requested by users. The task of the main data transferring device 2 can be considerably reduced. A data transferring path from the main data transferring device 2 toward that auxiliary data transferring devices 4 can be used for transferring other data, not for the thus frequently-requested data. It is possible to further enhance the operation efficiency. When a certain sound/moving picture data in requested for the first time, the sound/moving picture data in copied and stored in the auxiliary data transferring device. However, when the same data is requested at the subsequent times, it is unnecessary for any auxiliary stage devices to copy and store the data again. A period of time for the user to wait for transmission of his/her requested sound-and moving picture will be greatly shortend.

An described above, according to the present embodiment, the sound/moving picture reproduction system 1 is provided with the main data transferring device 2 which stores therein sound/moving picture data. The plurality of auxiliary data transferring devices 4 are provided as being connected in parallel to the main data transferring device 2. The auxiliary data transferring devices 4 are arranged in one or more stages, each stage being constructed from one or more auxiliary data transferring devices. The one or more stages are arranged along a data transfer direction defined from the main data transferring device 2 toward the plurality of data reproducing devices 8. The one or more stages of auxiliary data transferring devices include: a first stage of auxiliary data transferring devices which are located on the most upstream side in the data transfer direction and which are directly connected to the main data transferring device 2; and a final stage of auxiliary data transferring devices which are located on the most downstream side in the data transfer direction and which are directly connected to the data reproducing devices 8. Each of the plurality of auxiliary data transferring devices 4 can store copied data of received sound/moving picture date. Each of the plurality of data reproducing devices 8 reproduces received sound/moving picture data. The main data transferring device reads out sound/moving picture data and transfers the read sound/moving picture data to either one of the plurality of auxiliary data transferring devices. Upon receipt of the sound/moving picture data, the auxiliary data transferring device copies the received sound/moving picture data and transfers the copied sound/moving picture data to a desired data reproducing device.

Thus, the main data transferring device 2 distributes a plurality of sets of sound/moving picture data to the plurality of auxiliary data transferring devices 4. Each set of sound/moving picture data is copied and stored in the corresponding auxiliary data transferring device 4. Then, the thus copied sound/moving picture data is read out from the auxiliary data transferring device 4, and is transferred further to another auxiliary transferring device or a data reproducing device that is located in the downstream side of the transfer direction. Accordingly, it is sufficient that the main data transferring device 2 performs data transferring operation only to the first stage of data transferring devices 4 that are directly connected to the device 2. It is sufficient that each auxiliary data transferring device 4 performs data transferring operation only to the next stage of data transferring devices 4 or the data reproducing device 8 that is directly connected to the device 4. The plurality of auxiliary data transferring devices and the main data transferring device cooperate to perform the entire data transferring operation.

It is sufficient that each auxiliary data transferring device can copy and store only one set of sound/moving picture data that is requested to be transferred. It is sufficient that the auxiliary data transferring device be provided with a data storage area whose amount is smaller than that of the data storage area provided to the main data transferring device. Even when a large number of data reproducing devices are provided in the system, the system can be produced less costly to smoothly transfer required sound/moving picture data. This is because the system is constructed from the plurality of relatively small-sized data transferring devices.

In each auxiliary data transferring device, the copying operation to copy the received sound/moving picture data into the storage portion is performed simultaneously with the transferring operation to read out the copied data and transfer the data to an auxiliary data transferring device of the next stage or to one data reproducing device. It is possible to shorten the period of time required for waiting that data is entirely written into the data storage portion. It is therefore possible to shorten the entire time period from when the data reproducing device requests desired data to the main data transferring device and until when the data reproducing device receives the requested data and starts reproduction of the received data. A user at the data reproducing device can immediately enjoy his/her requested sound and moving picture.

Each of the plurality of data reproducing device 8 can request the main data transferring device to transfer desired sound/moving picture data. The main data transferring device produces transfer path specifying data specifying a transfer path, along which data is to be transferred toward the data reproducing device that has requested the main data transferring device to transfer sound/moving picture data. The main data transferring device retrieves the requested sound/moving picture data and adds the retrieved sound/moving picture data with the transfer path specifying data before outputting the retrieved sound/moving picture data to the transfer path specified by the transfer path specifying data. Upon receipt of the thus transferred data, the auxiliary data transferring device determines a transfer destination, to which the received sound/moving picture data is to be transferred next, with referring to the received path specifying data. The auxiliary data transferring device then outputs the received sound/moving picture data to the determined transfer destination. Thus, each auxiliary data transferring device, located at the data transfer path, can reliably transfer the received sound/moving picture data to its transfer destination while referring to the path specifying data added to the received sound/moving picture data.

The main data transferring device sets a transfer path, along which data is to be transferred toward the data reproducing device that has requested the main data transferring device to transfer sound/moving picture data. At least one auxiliary data transferring device in located on the transfer path for receiving the transferred sound/moving picture data and for transferring the received sound/loving picture data toward th data reproducing device. According to the modification, the main data transferring device informs each of the at least one auxiliary data transferring device, that is located on the data transfer path, of one next transfer destination, to which the subject auxiliary data transferring device should transfer sound/moving picture data. The main data transferring device outputs the requested sound/moving picture data to one of the at least one auxiliary storage devices that is located on the transfer path and that is connected directly to the main data transferring device. The data output portion performs its outputting operation after performing the destination informing operation. Each auxiliary data transferring device outputs received sound/moving picture data to its transfer destination, information of which has been received from the main data transferring device. With this structure, each auxiliary data transferring device, located on the transfer path, is informed of the transfer destination, to which the subject auxiliary data transferring device has to transfer the sound/moving picture data. The transfer operation can be achieved smoothly and reliably.

According to the other modification, the main data transferring device judges whether or not the requested sound/moving picture data has already been copied in one of the plurality of auxiliary data transferring devices and then instructs, when it is judged that one auxiliary data transferring device has already copied the requested sound/moving picture data, the one auxiliary data transferring device to output the copied sound/moving picture data toward the data reproducing device that has performed the requesting operation. With this structure, when sound/moving picture data requested In the present request operation had already been copied and stored in one auxiliary data transferring device, this data is used for the present transfer operation. It is possible to decrease the load on the main data transferring device (and the load on at least one auxiliary data transferring device that is located at the upstream side of the auxiliary data transferring device that has copied the subject sound/moving picture data). It is possible to further enhance the data transfer efficiency.

In the sound/moving picture reproduction system, the switch portion 72 is provided as capable of selectively connecting an output part of one auxiliary data transferring device to one data reproducing device. The switch control portion 71 is provided for receiving instruction from the main data transferring device and for controlling the switch portion 72 to connect the output portion of one auxillary data transferring device, located on the transfer path in its final stage, to the subject data reproducing device which has requested the transfer of the sound/moving picture data. With this structure, a data transfer path can be produced with using a data output portion of the final stage auxiliary data transferring device that in not being presently used. This data transfer path is connected to the data reproducing device with the switch portion 72.

While the invention has boon described In detail with reference to specific embodiment thereof, it would be apparent to those skilled in the art that various changes and modifications may be made therein without departing from the spirit of the invention.

For example, in the above-described operation shown in FIG. 6, the requested one not of sound/moving picture data (indicated by K) in transferred to one of the plurality of the auxiliary data transferring devices 4. However, the sound/moving picture data can be transferred to more than one of the auxiliary data transferring devices 4. The sound/moving picture data can be transferred to all of the auxiliary data transferring devices 4. For example, when more than one data reproducing devices a simultaneously request the same sound/moving picture, the main data transferring device 2 may possibly have to transfer the requested sound/moving picture data to more than one auxiliary data transferring device 4. For example, the main data transferring device 2 may possibly have to transfer or distribute the same sound/moving picture data to four auxiliary data transferring devices 4. In this case, the main data transferring device 2 prepares four sets of the requested same sound/moving picture data (4K), each data set of which is added with a header indicative of one auxiliary data transferring device 4 to which the subject data set is to be transferred. Then, the thus prepared four sets of data (4K) are transferred to the four auxiliary data transferring devices 4 respectively. That is, each net of data in transferred to a corresponding auxiliary data transferring device 4 as indicated by the added header. In each auxiliary data transferring device 4, the received sound/moving picture data is copied before being distributed through one or more corresponding output paths 12 toward one or more data reproducing devices 8 that have requested the data.

What is claimed is:

1. A sound/moving picture reproduction system, comprising:

a main data transferring device including a sound/moving picture data storing portion storing sound/moving picture data;

a plurality of auxiliary data transferring devices connected to the main data transferring device, each of the plurality of auxiliary data transferring devices including a copied data storing portion storing copied data of the received sound/moving picture data; and a plurality of data reproducing devices connected to at least a part of the plurality of auxiliary data transferring devices, each of the plurality of data reproducing devices reproducing received sound/moving picture data;

wherein the main data transferring device further includes a control portion for reading sound/moving picture data from the sound/moving picture data storing portion and for transferring the read sound/moving picture data to either one of the plurality of auxiliary data transferring devices;

wherein each of the plurality of auxiliary data transferring devices further includes a transfer control portion for, upon receipt of sound/moving picture data, copying the received sound/moving picture data into the copied data storing portion and for transferring the copied sound/moving picture data in a direction toward one of the plurality of data reproducing devices;

wherein each of the plurality of data reproducing devices further includes a sound/moving picture data request portion for requesting the main data transferring device to transfer desired sound/moving picture data;

wherein the main data transferring device includes a copied data output instruction portion judging whether the requested sound/moving picture data has already been copied in one of the plurality of auxiliary data transferring devices and instructing, when it is judged that one auxiliary data transferring device has already copied the requested sound/moving picture data, the one auxiliary data transferring device to output the copied sound/moving picture data toward the data reproducing device that has requested;

wherein all the plurality of auxiliary data transferring devices are directly connected in parallel to the main data transferring device; and wherein the plurality of data reproducing devices are connected to all the plurality of auxiliary data transferring devices.

2. A sound/moving picture reproduction system, comprising:

a main data transferring device including a sound/moving picture data storing portion storing sound/moving picture data;

a plurality of auxiliary data transferring devices connected to the main data transferring device, each of the plurality of auxiliary data transferring devices including a copied data storing portion storing copied data of the received sound/moving picture data; and a plurality of data reproducing devices connected to at least a part of the plurality of auxiliary data transferring devices, each of the plurality of data reproducing devices reproducing received sound/moving picture data;

wherein the main data transferring device further includes a control portion for reading sound/moving picture data from the sound/moving picture data storing portion and for transferring the read sound/moving picture data to either one of the plurality of auxiliary data transferring devices;

wherein each of the plurality of auxiliary data transferring devices further includes a transfer control portion for, upon receipt of sound/moving picture data, copying the received sound/moving picture data into the copied data storing portion and for transferring the copied sound/moving picture data in a direction toward one of the plurality of data reproducing devices;

wherein each of the plurality of data reproducing devices further includes a sound/moving picture data request portion for requesting the main data transferring device to transfer desired sound/moving picture data;

wherein the main data transferring device includes a copied data output instruction portion judging whether the requested sound/moving picture data has already been copied in one of the plurality of auxiliary data transferring devices and instructing, when it is judged that one auxiliary data transferring device has already copied the requested sound/moving picture data, the one auxiliary data transferring device to output the copied sound/moving picture data toward the data reproducing device that has requested; and wherein all the plurality of auxiliary data transferring devices are arranged in more than one stages so that the plurality of auxiliary data transferring devices include a first stage of auxiliary data transferring devices that are directly connected in parallel to the main data transferring device and at least one subsequent stage of auxiliary data transferring devices that are connected to the first stage of auxiliary data transferring devices, the at least one subsequent stage of auxiliary data transferring devices including a final stage of auxiliary data transferring devices that are connected in parallel to the plurality of data reproducing devices.

3. A sound/moving picture reproduction system, comprising:

a main data transferring device including a sound/moving picture data storing portion storing sound/moving picture data;

a plurality of auxiliary data transferring devices connected to the main data transferring device, each of the plurality of auxiliary data transferring devices including a copied data storing portion storing copied data of the received sound/moving picture data; and a plurality of data reproducing devices connected to at least a part of the plurality of auxiliary data transferring devices, each of the plurality of data reproducing devices reproducing received sound/moving picture data;

wherein the main data transferring device further includes a control portion for reading sound/moving picture data from the sound/moving picture data storing portion and for transferring the read sound/moving picture data to either one of the plurality of auxiliary data transferring devices;

wherein each of the plurality of auxiliary data transferring devices further includes a transfer control portion for, upon receipt of sound/moving picture data, copying the received sound/moving picture data into the copied data storing portion and for transferring the copied sound/moving picture data in a direction toward one of the plurality of data reproducing devices;

wherein each of the plurality of data reproducing devices further includes a sound/moving picture data request portion for requesting the main data transferring device to transfer desired sound/moving picture data;

wherein the main data transferring device includes a copied data output instruction portion fudging whether the requested sound/moving picture data has already been copied in one of the plurality of auxiliary data transferring devices and instructing, when it is judged that one auxiliary data transferring device has already copied the requested sound/moving picture data, the one auxiliary data transferring device to output the copied sound/moving picture data toward the data reproducing device that has requested; and wherein the transfer control portion includes a data writing/reading control portion to perform the copying operation and the transferring operation simultaneously with each other.

4. A sound/moving picture reproduction system, comprising:

a main data transferring device including a sound/moving picture data storing portion storing sound/moving picture data;

a plurality of auxiliary data transferring devices connected to the main data transferring device, each of the plurality of auxiliary data transferring devices including a copied data storing portion storing copied data of the received sound/moving picture data; and a plurality of data reproducing devices connected to at least a part of the plurality of auxiliary data transferring devices, each of the plurality of data reproducing devices reproducing received sound/moving picture data;

wherein the main data transferring device further includes a control portion for reading sound/moving picture data from the sound/moving picture data storing portion and for transferring the read sound/moving picture data to either one of the plurality of auxiliary data transferring devices;

wherein each of the plurality of auxiliary data transferring devices further includes a transfer control portion for, upon receipt of sound/moving picture data, copying the received sound/moving picture data into the copied data storing portion and for transferring the copied sound/moving picture data in a direction toward one of the plurality of data reproducing devices;

wherein each of the plurality of data reproducing devices further includes a sound/moving picture data request portion for requesting the main data transferring device to transfer desired sound/moving picture data;

wherein the main data transferring device includes a copied data output instruction portion judging whether the requested sound/moving picture data has already been copied in one of the plurality of auxiliary data transferring devices and instructing, when it is judged that one auxiliary data transferring device has already copied the requested sound/moving picture data, the one auxiliary data transferring device to output the copied sound/moving picture data toward the data reproducing device that has requested; and wherein the main data transferring device includes:

a transfer path data production portion producing transfer path specifying data for specifying a transfer path, along which data is to be transferred toward one of the plurality of data reproducing devices that has requested the main data transferring device to transfer sound/moving picture data; and a data output portion retrieving the requested sound/moving picture data from the sound/moving picture data storing portion, and adding the retrieved sound/moving picture data with the transfer path specifying data before outputting the retrieved sound/moving picture data to the transfer path determined by the transfer path specifying data.

5. The sound/moving picture reproduction system am claimed in claim 4, wherein each of the auxiliary data transferring devices includes:

a transfer destination determining portion determining a transfer destination, to which the received sound/moving picture data is to be transferred, with referring to the received path specifying data; and a data output portion outputting the received sound/moving picture data to the determined transfer destination.

6. A sound/moving picture reproduction system, comprising:

a main data transferring device including a sound/moving picture data storing portion storing sound/moving picture data;

a plurality of auxiliary data transferring devices connected to the main data transferring device, each of the plurality of auxiliary data transferring devices including a copied data storing portion storing copied data of the received sound/moving picture data; and a plurality of data reproducing devices connected to at least a part of the plurality of auxiliary data transferring devices, each of the plurality of data reproducing devices reproducing received sound/moving picture data;

wherein the main data transferring device further includes a control portion for reading sound/moving picture data from the sound/moving picture data storing portion and for transferring the read sound/moving picture data to either one of the plurality of auxiliary data transferring devices;

wherein each of the plurality of auxiliary data transferring devices further includes a transfer control portion for, upon receipt of sound/moving picture data, copying the received sound/moving picture data into the copied data storing portion and for transferring the copied sound/moving picture data in a direction toward one of the plurality of data reproducing devices;

wherein each of the plurality of data reproducing devices further includes a sound/moving picture data request portion for requesting the main data transferring device to transfer desired sound/moving picture data;

wherein the main data transferring device includes a copied data output instruction portion judging whether the requested sound/moving picture data has already been copied in one of the plurality of auxiliary data transferring devices and instructing, when it is judged that one auxiliary data transferring device has already copied the requested sound/moving picture data, the one auxiliary data transferring device to output the copied sound/moving picture data toward the data reproducing device that has requested; and wherein the main data transferring device includes:

a transfer path setting portion setting a transfer path, along which data is to be transferred toward one of the plurality of data reproducing devices that has requested the main data transferring device to transfer sound/moving picture data, at least one auxiliary data transferring device being located on the transfer path to receive the transferred sound/moving picture data and to transfer the received sound/moving picture data toward the data reproducing device that has requested;

a destination informing portion informing each of the at least one auxiliary data transferring device, located on the set transfer path, of a next transfer destination, to which the subject auxiliary data transferring device is to transfer sound/moving picture data; and a data output portion outputting the requested sound/moving picture data to one of the at least one auxiliary storage devices that is located on the set transfer path and that is connected directly to the main data transferring device, the data output portion performing its outputting operation after the destination informing portion performs its informing operation.

7. The sound/moving picture reproduction system as claimed in claim 6, wherein each of the auxiliary data transferring device includes a data output portion outputting received sound/moving picture data to its next transfer destination, information of which has been received from the destination information portion.

8. A sound/moving picture reproduction system comprising:

a main data transferring device including a sound/moving picture data storing portion storing sound/moving picture data;

a plurality of auxiliary data transferring devices connected to the main data transferring device, each of the plurality of auxiliary data transferring devices including a copied data storing portion storing copied data of the received sound/moving picture data; and a plurality of data reproducing devices connected to at least a part of the plurality of auxiliary data transferring devices, each of the plurality of data reproducing devices reproducing received sound/moving picture data;

wherein the main data transferring device further includes a control portion for reading sound/moving picture data from the sound/moving picture data storing portion and for transferring the read sound/moving picture data to either one of the plurality of auxiliary data transferring devices;

wherein each of the plurality of auxiliary data transferring devices further includes a transfer control portion for, upon receipt of sound/moving picture data, copying the received sound/moving picture data into the copied data storing portion and for transferring the copied sound/moving picture data in a direction toward one of the plurality of data reproducing devices;

wherein each of the plurality of data reproducing devices further includes a sound/moving picture data request portion for requesting the main data transferring device to transfer desired sound/moving picture data;

wherein the main data transferring device includes a copied data output instruction portion judging whether the requested sound/moving picture data has already been copied in one of the plurality of auxiliary data transferring devices and instructing, when it is judged that one auxiliary data transferring device has already copied the requested sound/moving picture data, the one auxiliary data transferring device to output the copied sound/moving picture data toward the data reproducing device that has requested;

wherein the plurality of auxiliary data transferring devices includes several auxiliary data transferring devices, each of which is provided with at least one output path, wherein the plurality of data reproducing devices are capable of being connected to the output paths from the several auxiliary data transferring devices to receive sound/moving picture data, each of the plurality of data reproducing devices reproducing the received sound/moving picture data, further comprising:

a switch mechanism portion capable of selectively connecting the output paths from the several auxiliary data transferring devices to the data reproducing devices, the switch mechanism portion including:

a plurality of switches capable of connecting and disconnecting the output paths from the several auxiliary data transferring devices to and from the plurality of data reproducing devices; and a switch control portion controlling the plurality of switches to selectively connect and disconnect the output paths from the several auxiliary data transferring devices to and from the plurality of data reproducing devices, wherein the main data transferring device includes:

a transfer path determining portion that requests, in response to the request from one data reproducing device, the switch control portion to supply the transfer path determining portion with information on a non-occupied output path, and that determines one transfer path, along which the desired data is to be transferred from the main data transferring device toward the non-occupied output path, at least one auxiliary data transferring device being located on the determined transfer path, the transfer path determining portion controlling the at least one auxiliary data transferring device on the determined transfer path to transfer the desired data along the transfer path; and a switch instruction portion that instructs the switch control portion to control one of the plurality of switches to connect the non-occupied output path with the data reproducing device that has requested the main data transferring device to transfer the desired sound/moving picture data.

9. The sound/moving picture reproduction system as claimed in claim 8, wherein the plurality of auxiliary data transferring devices are arranged in more than one stages so that the plurality of auxiliary data transferring devices include a first stage of auxiliary data transferring devices that are directly connected in parallel to the main data transferring device and at least one subsequent stage of auxiliary data transferring devices that are connected to the first stage of auxiliary data transferring devices, the at least one subsequent stage of auxiliary data transferring devices including a final stage of auxiliary data transferring devices that are connected in parallel, via the switch mechanism portion, to the plurality of data reproducing devices, each of the final stage of auxiliary data transferring devices being provided with the at least one output path, wherein the switch mechanism portion is capable of selectively connecting the output paths from the final stage of auxiliary data transferring devices to the plurality of data reproducing devices, the plurality of switches being capable of connecting and disconnecting the output paths from the final stage of auxiliary data transferring devices to and from the plurality of data reproducing devices, the switch control portion controlling the plurality of switches to selectively connect and disconnect the output paths from the final stage of auxiliary data transferring devices to and from the plurality of data reproducing devices.

10. The sound/moving picture reproduction system as claimed in claim 9, wherein each of the final stage of auxiliary data transferring devices is provided with several output paths via a corresponding hub portion.

* * * * *